United States Patent
Sirovich

(10) Patent No.: US 9,078,402 B2
(45) Date of Patent: Jul. 14, 2015

(54) SYSTEM AND METHOD FOR DECREASING THE INTENSITY AND FREQUENCY OF TROPICAL STORMS OR HURRICANES

(76) Inventor: Lawrence Sirovich, New York, NY (US)

( * ) Notice: Subject to any disclaimer, the term of this patent is extended or adjusted under 35 U.S.C. 154(b) by 21 days.

(21) Appl. No.: 13/610,345

(22) Filed: Sep. 11, 2012

(65) Prior Publication Data

US 2013/0008365 A1     Jan. 10, 2013

Related U.S. Application Data

(63) Continuation-in-part of application No. 11/317,062, filed on Dec. 22, 2005, now Pat. No. 8,262,314.

(51) Int. Cl.
*A01G 15/00*     (2006.01)
*B63G 8/00*     (2006.01)

(52) U.S. Cl.
CPC ...................................... *A01G 15/00* (2013.01)

(58) Field of Classification Search
CPC ....................................................... A01G 15/00
USPC .......... 405/52, 195.1; 114/330; 239/2.1, 14.1; 165/45
See application file for complete search history.

(56) References Cited

U.S. PATENT DOCUMENTS

| | | | | |
|---|---|---|---|---|
| 3,450,083 | A * | 6/1969 | Haselton et al. | 114/330 |
| 3,452,966 | A * | 7/1969 | Smolski | 261/77 |
| 3,896,622 | A | 7/1975 | Daniello | |
| 4,026,527 | A * | 5/1977 | Costen | 366/167.1 |
| 4,044,720 | A | 8/1977 | Fast | |
| 4,054,104 | A * | 10/1977 | Haselton | 114/264 |
| 4,470,544 | A * | 9/1984 | Bronicki et al. | 239/2.1 |
| 4,656,959 | A | 4/1987 | Moisdon | |
| 4,724,086 | A | 2/1988 | Kortmann | |
| 5,092,268 | A | 3/1992 | Taylor | |
| 5,121,702 | A * | 6/1992 | Johnson et al. | 114/330 |
| 5,492,274 | A | 2/1996 | Assaf et al. | |
| 6,231,268 | B1 * | 5/2001 | Hausenbauer | 405/61 |
| 6,428,711 | B1 | 8/2002 | Nakamura et al. | |
| 7,329,351 | B2 | 2/2008 | Roberts et al. | |
| 2002/0008155 | A1 * | 1/2002 | Uram | 239/14.1 |
| 2002/0009338 | A1 * | 1/2002 | Blum et al. | 405/303 |
| 2004/0011881 | A1 * | 1/2004 | Morales | 239/2.1 |
| 2004/0244382 | A1 * | 12/2004 | Hagen et al. | 60/775 |
| 2005/0031417 | A1 * | 2/2005 | Hofer et al. | 405/52 |
| 2005/0061721 | A1 * | 3/2005 | Tormaschy et al. | 210/121 |

(Continued)

OTHER PUBLICATIONS

Carmody, Th. (1964) J. Basic Engng. Trans. A.S.M.E., 86D, 689.

(Continued)

*Primary Examiner* — Tara M. Pinnock
(74) *Attorney, Agent, or Firm* — Myron Greenspan Lackenbach Siegel LLP

(57) ABSTRACT

Submarines are provided with bluff-shaped surfaces and/or fins used for modification of tropical storms or hurricanes by mixing the upper layer of a section of a body of water with water from a lower section of the body of water. By coordinating a number of submarines to traverse a region of a tropical storm or ahead of a hurricane the cooled water reduces the amount of heat energy available to fuel the intensity and movement of storms. A perforated plate of approximately 100 m×100 m is used, with or without fins, to mix layers of water by creating sufficient turbulence to create eddies up to 50 m. Submarines are used to entrain fluid motion to induce anti-cyclonic vorticity in the body of water.

21 Claims, 12 Drawing Sheets

(56) References Cited

U.S. PATENT DOCUMENTS

2005/0133612 A1* 6/2005 Uram .................. 239/2.1
2007/0119495 A1   5/2007 Sumrall

OTHER PUBLICATIONS

Chevray, R. (1968) The turbulent wake of a body of revolution. J. Basic Engineering, vol. 90.

Handbook of Chemistry and Physics (1973).

Jiménez, J.M., Allen, J.J. and Smits, A.J. (2001) Preliminary velocity measurements in the wake of a submarine model. 4th International Symposium of Particle Image Velocimetry, Gottingen, Germany, Sep. 17-19.

Lin, J.-T. & Pao, Y.-H. (1979) Wakes in stratified fluids. Ann. Rev. Fluid Mech., 11:317-338.

Polmar, N. & Moore, K.J. (2003) Cold War Submarines. Potomac Books.

Schlichting, H. (1966) Boundary-Layer Theory. In: Series in Mechanical Engineering 6th Edition, New York:McGraw Hill.

Serruya, C. (1989) Effects of Artificial Sea Mixing. In: Global Climate Change: Human and Natural Influences, (Ed. S. Fred Singer) Paragon House.

Townsend, A.A. (1956) The Structure of Turbulent Shear Flow, Cambridge:Cambridge Univ. Press.

Lin, J.-T. & Pao, Y.-H. (1979) Wakes in stratified fluids. Ann. Rev. Fluid Mech., 11:317.338.

Schooley, A.H., Stewart, R.W. (1963) Experiments with a self-propelled body submerged in a fluid with a vertical density gradient. J. Fluid Mech., 9:83-96.

Tzvetkov, E. & Assaf, G. (1982). The Mediterranean heat storage and Israeli precipitation. Water Resources Research 18: 1036-1040.

* cited by examiner

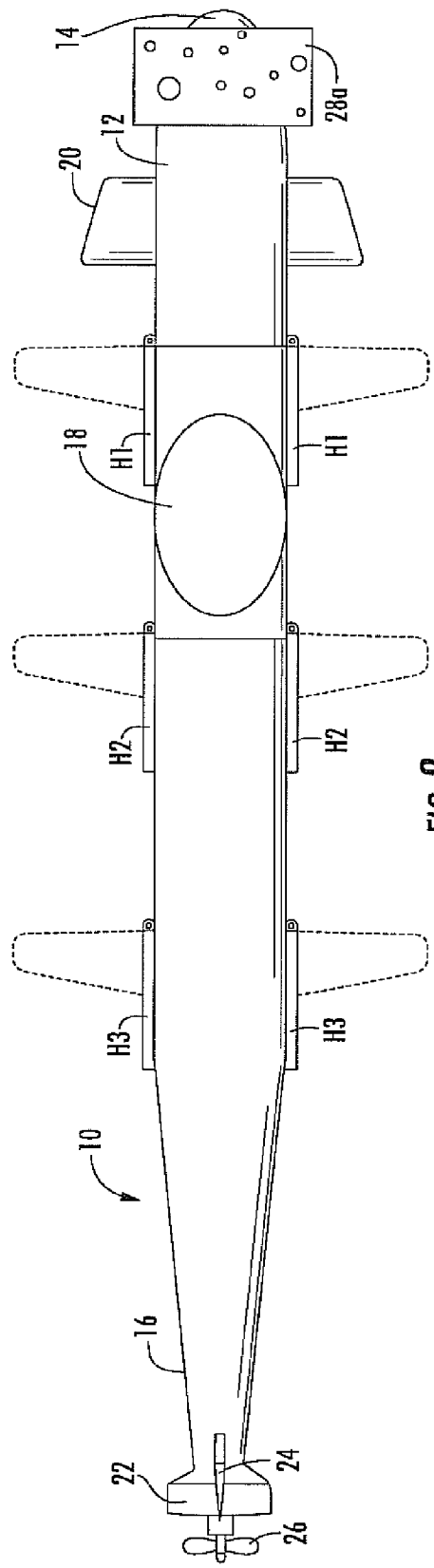
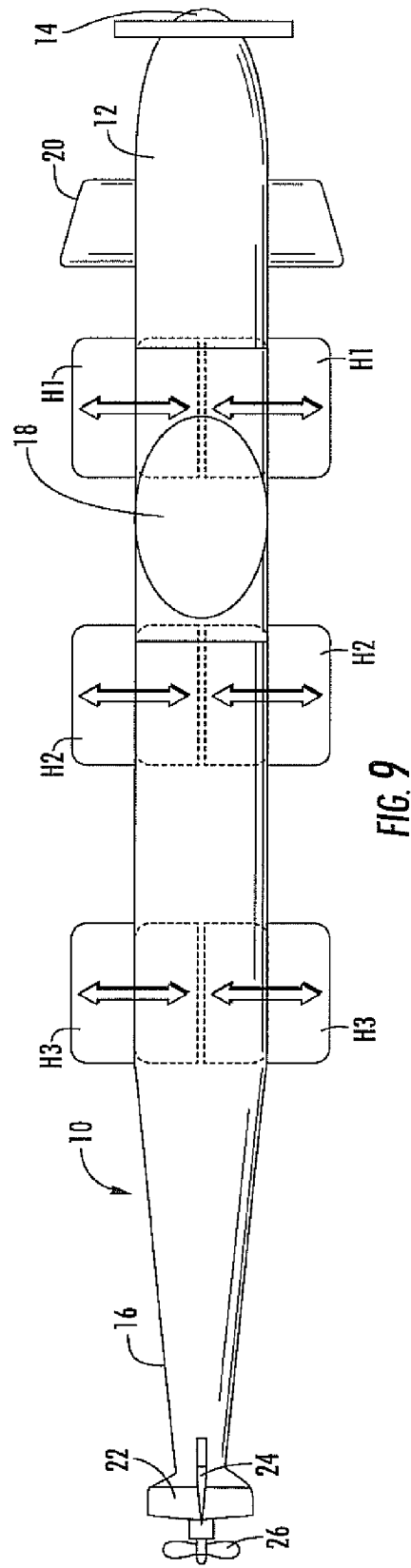
FIG. 8
FIG. 9

SYSTEM AND METHOD FOR DECREASING THE INTENSITY AND FREQUENCY OF TROPICAL STORMS OR HURRICANES

CROSS-REFERENCE TO RELATED APPLICATION

This application is in part a divisional and in part a continuation-in-part (CIP) of U.S. patent application Ser. No. 11/317,062 filed on Dec. 22, 2005 now U.S. Pat. No. 8,262,314.

FIELD OF THE INVENTION

The present invention generally relates to the field of weather modification, and more specifically, to methods and systems for modifying and suppressing the spawning of tropical storms, and modification of the dynamics of hurricanes and diminishing their intensity.

BACKGROUND INFORMATION

Two reports "Managing the Risks of Extreme Events and Disasters to Advance Climate Change Adaptation", Special Report of the Intergovernmental Panel on Climate Change, 2012) henceforth referred to as Managing (see NYTimes, July 10 editorial, "Heating Up) and "The Impact of Climate Change on the Hurricane Damages in the United States" (R. Mendelsohn, K. Emanuel, S. Chonabayashi, The World Bank, Finance Economics and Urban Department, Global Facility for Disaster Reduction and Recovery, 2011) henceforth referred to as Impact portend possible dire consequences of climate change. While the quality and quantity of climate change may be debatable the risks that this change foreshadows cannot be ignored. Both reports show the need for a unified long term program to explore possibilities for diminishing the devastating consequences of tropical cyclone activity. It is the recommendation in this application and applicant's parent application, now issued as U.S. Pat. No. 8,262,314 ("Patent"), that the techniques proposed by applicant be part of the exploratory process.

Impact is a wide ranging comprehensive report based on known statistics and extensive modeling of hurricane activity in the United States. Both Impact & Managing point out that for example a Katrina is an example of a rare event, as are many extreme natural disasters, and therefore one cannot draw convincing predictions from a history of such events. But if climate change is indeed occurring, then increased incidence of such rare events is a compelling consequence.

Intense cyclonic events are global phenomena and in the United States account on average for about $10 billion/year cost in damages (Impact, 2011). In the absence of climate change, and purely on the basis of income and population growth by the year 2100 the forecast is this will rise to between $27 billion/year and $55 billion/year (Impact, 2011).

If climate change predictions are incorporated the yearly destructive costs are expected to lie between $70 billion and $120 billion by the year 2100. Additional effects such as sea level rise have not been factored into these calculations (Impact, 2011).

The world's oceans and seas typically have temperature versus depth profiles that can be characterized generally as shown in FIG. 1. For example, the upper layer is usually at a uniform temperature as a result of wind and wave mixing. The temperature is determined by the intensity and duration of solar radiation, as well as the efficiency of wind driven surface mixing. Although the depth of the upper layer varies depending on the season, a nominal depth for the upper layer is approximately 20-25 meters. Deeper water is usually significantly colder, approximately 10° C. colder than the upper layer. The transition between upper and lower layers is referred to as the thermocline. The thermocline has a nominal thickness of approximately 20 meters. Although these dimensions vary depending on the time of year and geographic location, the numbers presented are for illustrative purposes.

It is well-known that hurricanes that travel to North America originate from tropical storms that are spawned in the tropical waters of the eastern Atlantic, near the Western coast of Africa. It also is understood that the originating tropical storms, and the hurricanes which develop from them, are fueled by the energy content of the warm, upper layers of the ocean. There is a strong correlation between the frequency and strength of such storms and the energy content of those upper, heated layers of the ocean.

Accordingly, decreasing the temperature of this upper layer of ocean water could diminish the occurrence and intensity of tropical storms. In addition, decreasing the temperature of the upper, warmer layer of ocean in the path of a hurricane could (1) diminish, or quench, the strength of a hurricane; or (2) alter the course of a hurricane.

U.S. Pat. Nos. 4,470,544 and 5,492,274 disclose methods for slowly mixing layers of sea water to achieve greater rainfall in the Mediterranean basin. Slowly mixing layers of a large body of water increases the potential solar energy captured by the water, and increases the intensity of storms fueled by the energy content of the water. To diminish the strength of a hurricane or alter its course, however, rapid mixing of ocean layers is required.

SUMMARY OF THE INVENTION

The present invention provides an exemplary method for affecting the strength and/or direction of a storm, such as a hurricane, by cooling the upper, warmer layer of a large body of water and mixing it with the significantly cooler water that exists below the relatively warmer upper layer. The displacement and resulting mixing is achieved, for example, by submarines or other suitable vessels operating in the thermocline, the transition layer between the upper warm layer and the deeper cold layer of ocean.

In one exemplary embodiment of the present invention, relatively large areas of East Atlantic tropical waters are cooled to reduce the intensity and/or frequency of tropical storms.

In a second exemplary embodiment of the present invention, sections of upper ocean layers in the vicinity of a hurricane, or in the vicinity of the expected path of a hurricane, are rapidly cooled to alter the course of a hurricane or reduce the intensity of a hurricane.

In another exemplary embodiment the technique is applied in the region of a tropical depression or storm in an effort to prevent the development of a hurricane.

A system for cooling a section of a large body of water forming an upper warmer layer of water and a cooler lower layer of water, comprises a) a plurality of submarines at predetermined positions in a section of the large body of water; and b) at least one turbulence generating device attached to each of the submarines, said predetermined positions being selected so that when said plurality of submarines follow a predetermined path through the section of the large body of water at a selected speed sufficient to create eddy turbulence and mix the warmer upper layer of the section of the large body of water with water from the cooler lower layer of the section of the large body of water as a result of movement of said at least one turbulence generating device through a thermocline layer of the section of the large body of water, mixing being achieved by generating eddy turbulence while upwardly displacing sufficient cooler water into the upper warmer layer of water to lower the temperature of the upper layer in the section over an area corresponding to a core region of a hurricane.

BRIEF DESCRIPTION OF THE DRAWINGS

FIG. 8 is a top plan view of the submarine shown in FIG. 7 showing positioning of the fins to positions generally coextensive with the length direction of the submarine;

FIG. 9 is similar to FIG. 8 but showing the bluff surface panel and fins in their operational positions;

DETAILED DESCRIPTION

Based on Gray (1979), Lighthill (1998), summarizes six conditions deemed necessary, thermodynamic and mechanical, in order to generate and sustain a hurricane. One essential condition is that the ocean surface layer must be at least 26° C., in order to provide sufficient latent-heat input to sustain cyclonic activity. Gallacher et al (1989), and Emanuel (1989), indicate that "a 2.5° C. decrease in temperature near the core of the storm (hurricane) would suffice to shut down energy production entirely". At ocean depths below the surface layer (~20 m) the thermocline begins and leads to a near limitless supply of very cold ocean water. Nominally the deep cold ocean water is only 0.2% denser than the warm surface ocean. Thus, relatively little work is required to lift the cold water to the surface. A central idea discussed in Applicant's U.S. Pat. No. 8,262,314 is that deep cold ocean water can be used to cool the surface layer along the hurricane path in order to diminish the intensity of an evolving hurricane.

Simply lifting cold ocean water to the surface is inadequate for cooling the surface layer since the prevailing stratification will restore the colder ocean water to its appropriate depth, with negligible mixing. Thorough mixing of the warm surface layer with the deep cool ocean water will be required to produce a new cooler and relatively stable surface layer. Turbulent mixing provides the optimal method for achieving the mixing of the warmer surface and cooler thermocline layers.

Figure 1:
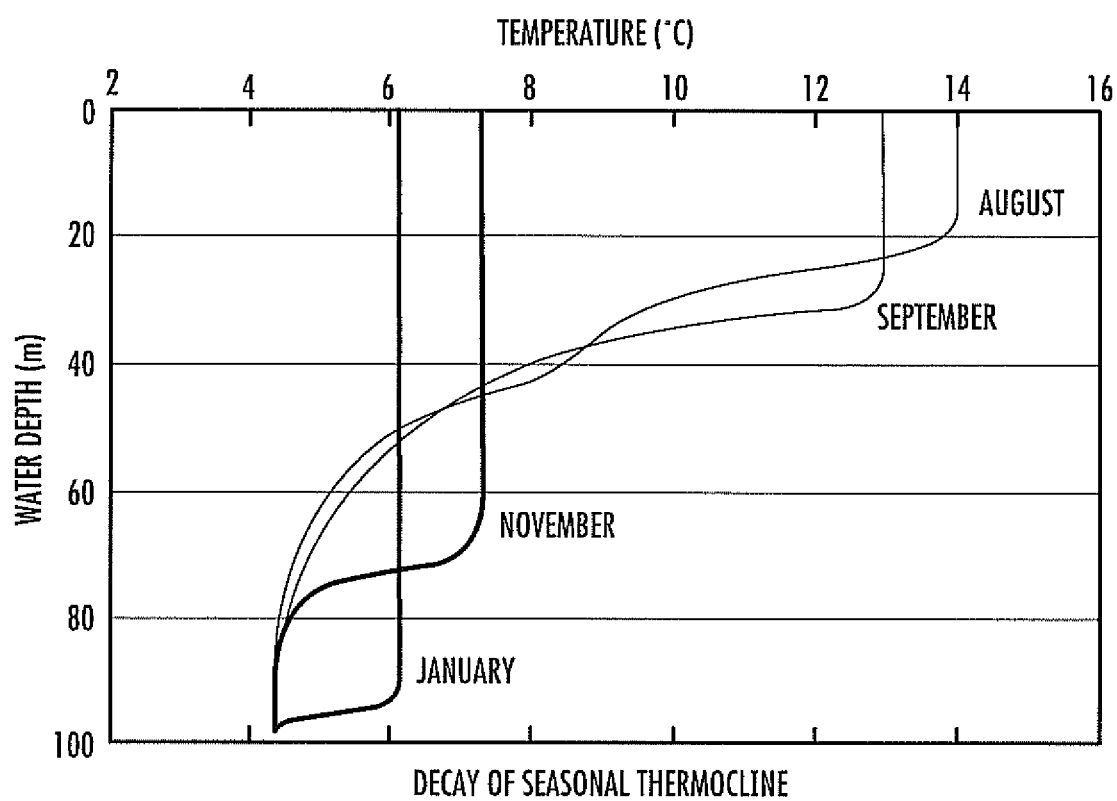
FIG. 1 is a diagram depicting the water depth of the thermocline for various months of the year.
Figure 2:
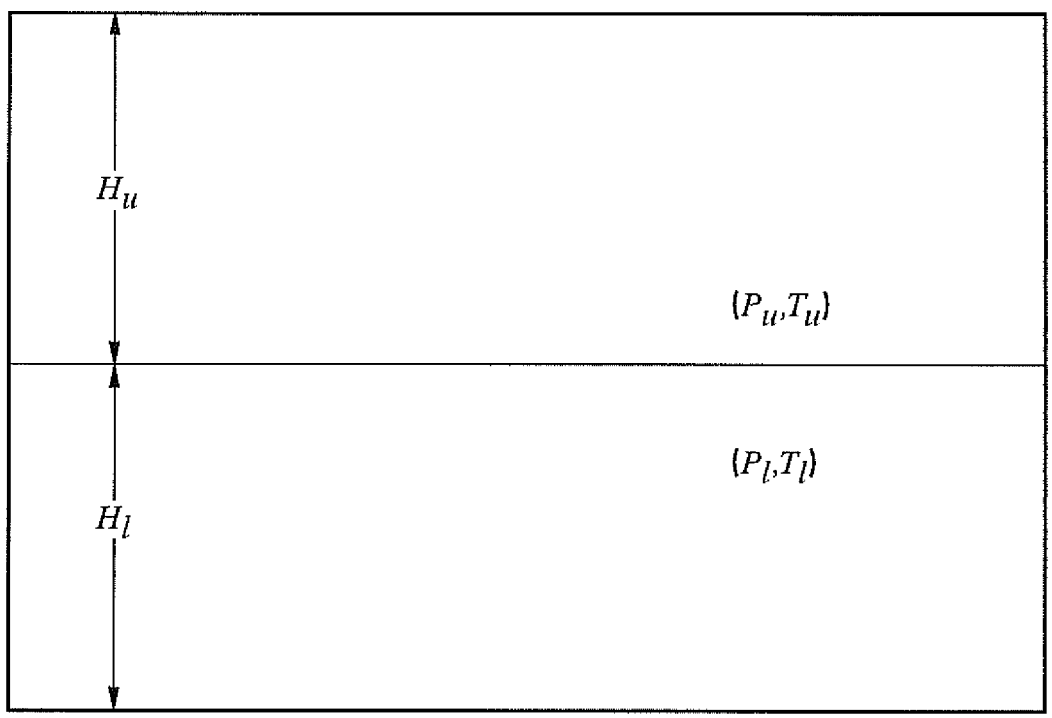
FIG. 2 is a diagram depicting the warmer, upper layer of a large body of water and the cooler, lower layer of the large body of water.

A simple calculation suffices for determining the work required to cool the upper layer of a section of a large body of water by mixing it with water from a lower layer. For illustrative purposes, the large body of water is assumed to be the Atlantic Ocean. FIG. 2 depicts the approximate heights, densities and temperatures of two layers of the ocean as ($H_u$, $\rho_u$, $T_u$) and ($H_l$, $\rho_l$, $T_l$) respectively for the upper and lower layers. If a 1 m² column height $H_l$ is raised to the average height of $H_u/2$ the work, W, required to displace such a column of ocean water can be estimated by the equation $$W = \frac{g}{2}(\rho_l - \rho_u)H_l H_u \qquad (1)$$

where g represents acceleration due to gravity (approximately 10 m/s²). The resulting 1 m² column of height $H_l+H_u$ will be at the approximate temperature $$\langle T \rangle = \frac{H_u T_u + H_l T_l}{H_u + H_l} \qquad (2)$$

and a temperature reduction of $$T_u - \langle T \rangle = \frac{(T_u - T_l)H_l}{H_u + H_l}. \qquad (3)$$

The heavy, colder, lower layer of the ocean is approximately 0.2% heavier than the warm, upper layer of the ocean as explained in the Handbook of Chemistry and Physics, 1973 at D221, which is hereby incorporated by reference. As is known in the art, the nominal density of seawater in the upper layer is approximately 1025 kg/m³ and the nominal density of seawater in the colder, lower layer is approximately 1027 kg/m³. Therefore, for $$H_u=50\ m, H_l=20 M(g=10\ m/s^2, \rho_l-\rho_u=2\ kg/m^3),$$

the work required to displace the colder water into the upper warmer water is approximately $W=10^4$ joules. Under summer conditions, the water temperature of the new upper layer will be about 5° C. colder as a result of mixing the lower layer of colder water into the upper layer. For a nominal surface area of ocean of $10^{10}$ m² (roughly 3600 sq. miles), the work needed to mix the upper and lower layers in this fashion would be approximately $\overline{W}=10^{14}$ joules.

Figure 3:
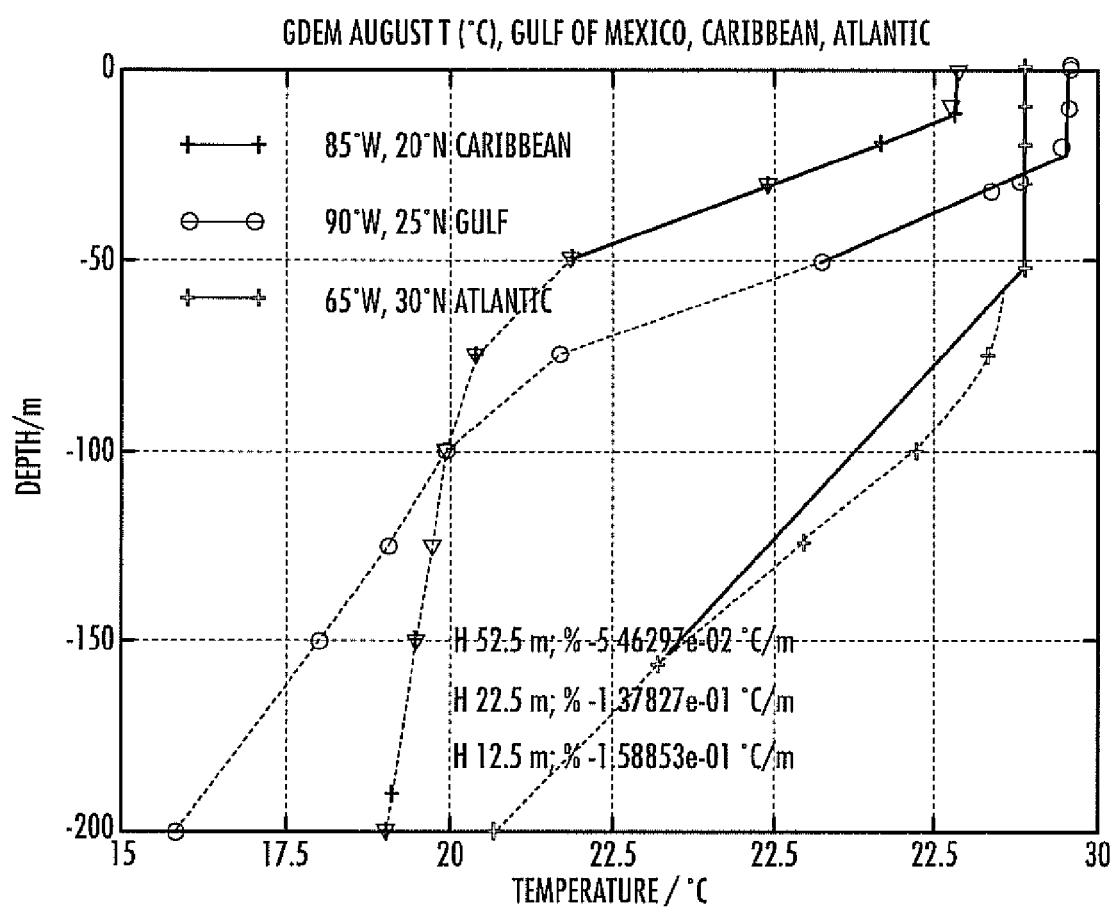
FIG. 3 illustrates examples of ocean temperature variations for the month of August in the Gulf of Mexico, the Caribbean and the Atlantic Ocean.

FIG. 3 shows three examples of ocean temperature variation. If for example we consider the Atlantic profile (east of Georgia/Florida) then for this August profile, $$H_u \approx 20\ m,\ H_l \approx 40\ m; \qquad (4)$$

and $$T_u \approx 28°, T_l \approx 22°, \qquad (5)$$

Then for $$g=9.8\ m/s^2; \rho_l=1.027\ kg/m^3; \rho_u=1.025\ kg/m^3 \qquad (6)$$

(1) yields $$\overline{W} \approx 10^4\ Joules(J), \qquad (7)$$

and substitution in (3) gives $$T_u - \langle T \rangle \approx 5°\ C. \qquad (8)$$

where the numbers have been rounded since the calculation is nominal.

As a model calculation, it should be sufficient to cool the path of the hurricane track by 5° C. a half day before landfall in order to diminish the intensity of a hurricane. Based on a 30 mile wide core hurricane track and a 10 mph speed of the hurricane this requires 12 mi.×10 mi.×30 mi.=3600 sq miles≈$10^{10}$ m² will need to be cooled. Thus multiplying (7) by $10^{10}$ yields $$\overline{W} \approx 10^{14}\ Joules \qquad (9)$$

of work which is roughly the yield of one (Nagasaki) atomic bomb. Next we consider whether a pack of submarines might be capable of cooling such an expanse of ocean in a reasonable time for altering hurricane intensity.

Mixing Layers of Large Bodies of Water

Submarines offer a highly efficient means of ocean travel. Unlike surface ships, submarines create virtually no wave drag. Although performance information on nuclear submarines remains largely confidential, typical cruise speeds are reasonably assumed to be in excess of 30 knots, or approximately 15 m/sec. Nuclear submarines are highly streamlined, but only limited data is available in the literature concerning their performance and drag characteristics. See Polmar & Moore, Cold War Submarines (2003). However, a consensus value for the coefficient of drag of a nuclear submarine is $c_f^0 \approx 0.4$ as understood by those skilled in the art.

Figure 4:
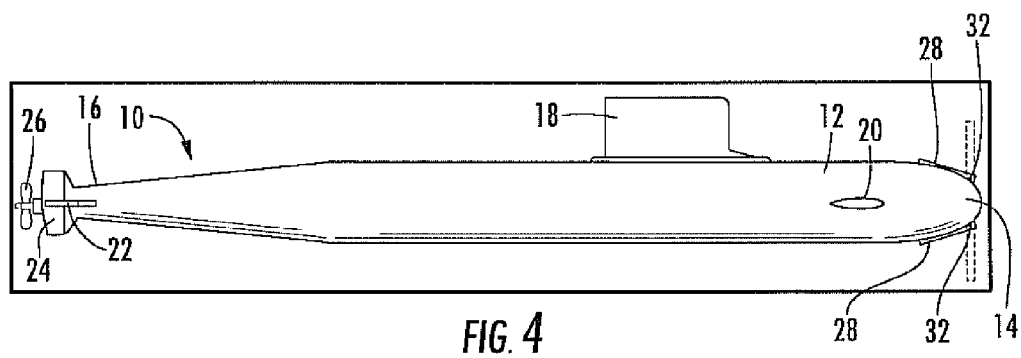
FIG. 4 is a diagram of a submarine with a bluff-shaped obstacle mounted at the bow of the submarine, according to an exemplary embodiment of the present invention, showing the obstacle in a collapsed or retracted condition.
Figure 5:
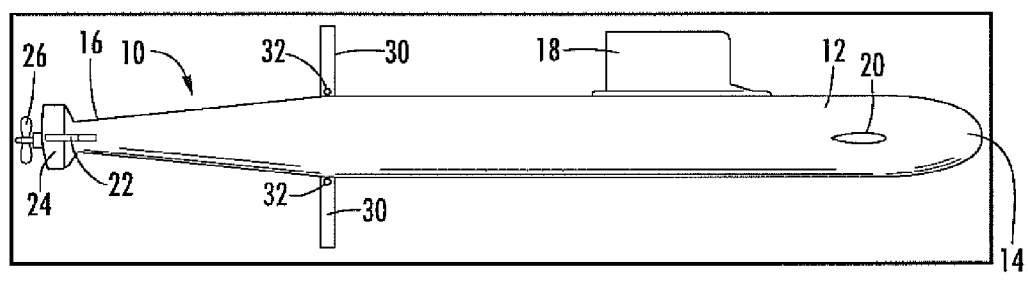
FIG. 5 is a diagram of a submarine with a modified bluff-shaped obstacle mounted on the submarine at a location that is downstream from the bow of the submarine according to an exemplary embodiment of the present invention, showing the obstacle in an extended operative position.

Referring to FIG. 4 a submarine 10 includes an elongate hull 12 generally defining a longitudinal axis and a bow 14 at the leading or upstream end of the hull and a stern 16 at the trailing or downstream end. A conning tower 18 is provided above the hull. Bow planes or forward hydroplanes 20 and stern planes or aft hydroplanes 22 are used to raise or lower the bow 14 relative to the stern 16 to move the submarine upwardly towards or downwardly away from the surface. Turning is achieved with a rudder 24, all while the submarine is propelled forwardly by means of propeller 26. A single bluff-shaped panel or split panels 28 as shown in FIG. 4 can be mounted at the bow 14, or panels 30 can be mounted mid-hull or downstream from the bow, as shown in FIG. 5, for reasons to be discussed.

Performance information on nuclear submarines is not readily available and estimates, based on what might be considered common knowledge, are ballpark figures. If the cruise speed of a sub is $U_s \approx 15$ m/s (30 kts.); its drag coefficient $c_f^0 \approx 0.4$ and its cross-sectional area $A \approx 10^2$ m then its power output will be $$P = \frac{1}{2}\rho U_o^3 c_f^o A \approx 50\ MW = 5 \times 10^7\ Joules/sec \qquad (10)$$

which is roughly equal to the output of the Burlington, Vt. power station.

Nuclear submarines can remain submerged for very long periods of time. Also, underwater travel is relatively unaffected by surface conditions. Hurricanes do not significantly affect submarine dynamics at a depth of approximately 50 m.

The streamlined features of a submarine makes it less than optimal for rapidly mixing layers of the ocean. In order to achieve rapid mixing of ocean layers, turbulent flow with eddy generation in the 10 m or larger diameter range is desirable. As shown in FIGS. 4 and 5, such eddy generation can be achieved, for example, by (1) mounting a bluff-shaped obstacle 28 on the bow 14 of the submarine capable of generating the necessary eddy turbulence, such as a 10 m×10 m flat plate (normal to the direction of travel); or (2) mounting at some other location downstream of the bow of the submarine a bluff-shaped obstacle 30 capable of generating the necessary eddy turbulence.

Figure 6:
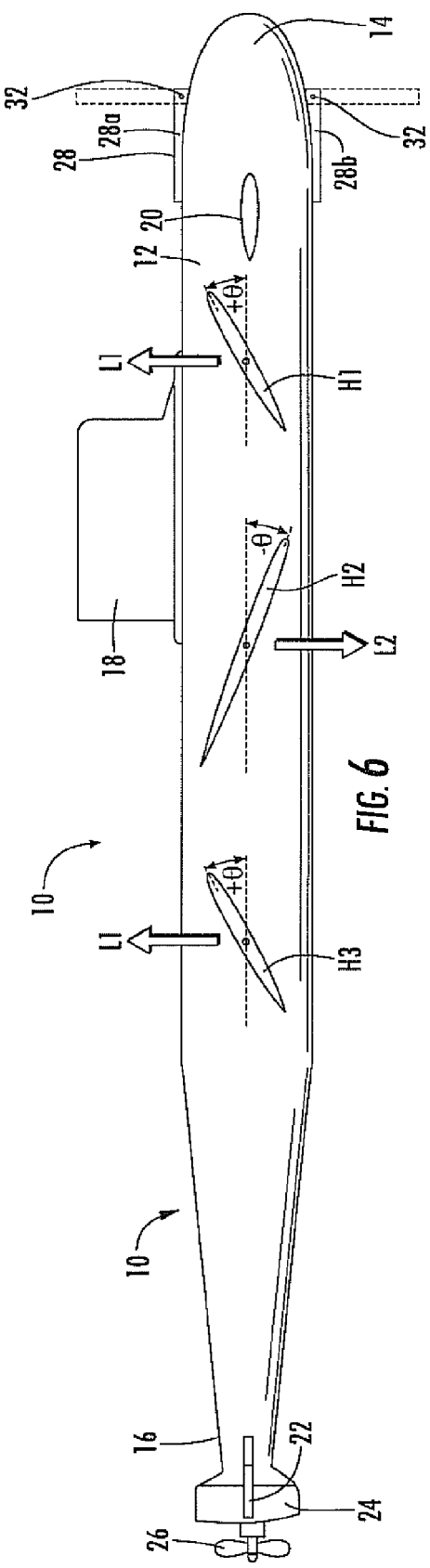
FIG. 6 is similar to FIG. 4 with the modified bluff surface panel at the bow of a submarine in a collapsed condition and adjustable fins longitudinally spaced from each other along the submarine for enhancing the mixing of a body of water.
Figure 7:
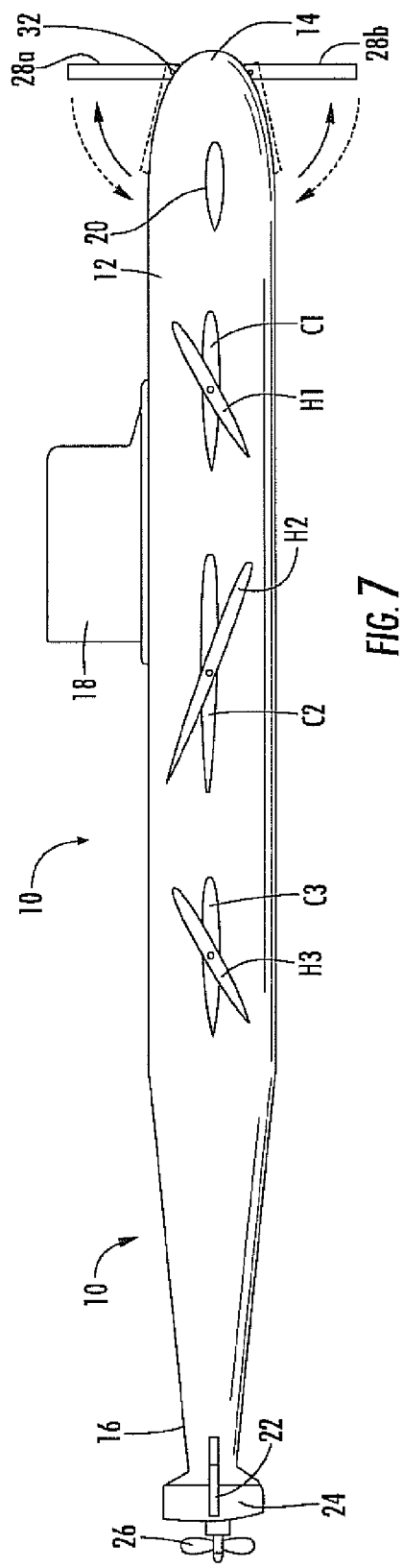
FIG. 7 is similar to FIG. 6 illustrating the bluff surface panels in the extended operational positions.

Turbulence devices such as bluff shaped objects may be mounted on the submarine so that they lie sufficiently flat along the outer surface of the submarine, or located along or within the hull of the submarine, in collapsed positions, when turbulence generation is not desired (e.g. when the submarine is traveling to the section of the large body of water to be cooled) as shown in FIGS. 4, 6, and 8. When turbulent flow is desired, the bluff shaped objects could extended to fold away from the surface of the submarine or extend outwardly from the surface of the submarine to generate the necessary eddy turbulence as shown in FIGS. 5, 7 and 9.

Eddy generation can also be achieved, for example, by towing, behind the submarine, one or more bluff-shaped obstacles capable of generating the necessary eddy turbulence. Towing the bluff-shaped obstacles would also add more fluctuations. The towed obstacles may be attached to the submarines by cables, ropes, rods, chains, or similar means.

A nominal drag coefficient for a flat plate moving normal to itself is 1.6. If we denote the coefficient of drag of the above modified submarine by $c_f^b$, and assume that the cross-sectional area of the modified submarine is equal to the original cross-sectional area of the submarine, it follows that under constant power, the speed of the modified submarine, $U^b$, is reduced by a factor of $$\left(\frac{U^b}{U_0}\right) = \left(\frac{c_f^0}{c_f^b}\right)^{1/3} (\approx 0.63) \qquad (10)$$

Given a speed of $U_0$=30 knots (kts) for an unmodified submarine, a modified submarine would travel at an approximate speed of $U^b \approx 18$ kts, which is sufficient to outrun typical hurricanes.

Referring to FIGS. 6-9 submarines are shown with exemplary arrangements of turbulence generating devices. In FIG. 6 the submarine 10 includes upper and lower flat plates 28a, 28b shown in collapsed positions about pivots or hinges 32 to minimize drag, and that are selectively movable to the extended or operative positions (dash outline). The submarine also has three fins or hydrofoils H1, H2, H3 (on each side of the vessel hull) that are mounted on shafts substantially normal to the axis of the hull so they can be rotated to change the angles of attack θ relative to the forward motion of the vessel—typically ±10-12° (FIG. 6). With the fins H1 and H3 oriented at +θ and H2 at −θ), with H2 having approximately twice the surface area of H1 and H3 the respective lifts L1 and L2 are related as follows $$2L1 \approx L2 \quad (11)$$

so that the fins H1-H3 do not contribute to net or overall lift and the submarine continues to exhibit neutral buoyancy.

Thus, the submarine may be provided with deployable fins, starboard and port, that can be moved between collapsed, undeployed positions and extended, deployed positions. In the deployed positions the three pairs of fins or hydrofoils H1-H3 may be axially spaced 25 m from each other. As indicated, the forward and aft find H1 and H3 provide equal lift while the mid-hull pair of fins H2 provide twice the amount of negative lift. Thus, there is no net change in lift while this arrangement results in an eddy of roughly 50 m that is conferred to the turbulent flow about the submarine.

In FIG. 7 the bluff plates 28a, 28b are shown extended in the operative positions defining planes normal to the axis of the submarine at the forward end of the submarine. In FIG. 8 the fins are shown in their undeployed positions parallel to the forward directions of movement to eliminate drag.

In FIG. 9 another arrangement is shown in which the fins are mounted for retraction into the hull when not in use. Referring to FIG. 7 cavities C1-C3 are provided in the hull for this purpose that conform to the shapes of the fins H1-H3 and can receive the fins after they are aligned with the cavities.

Figure 10:
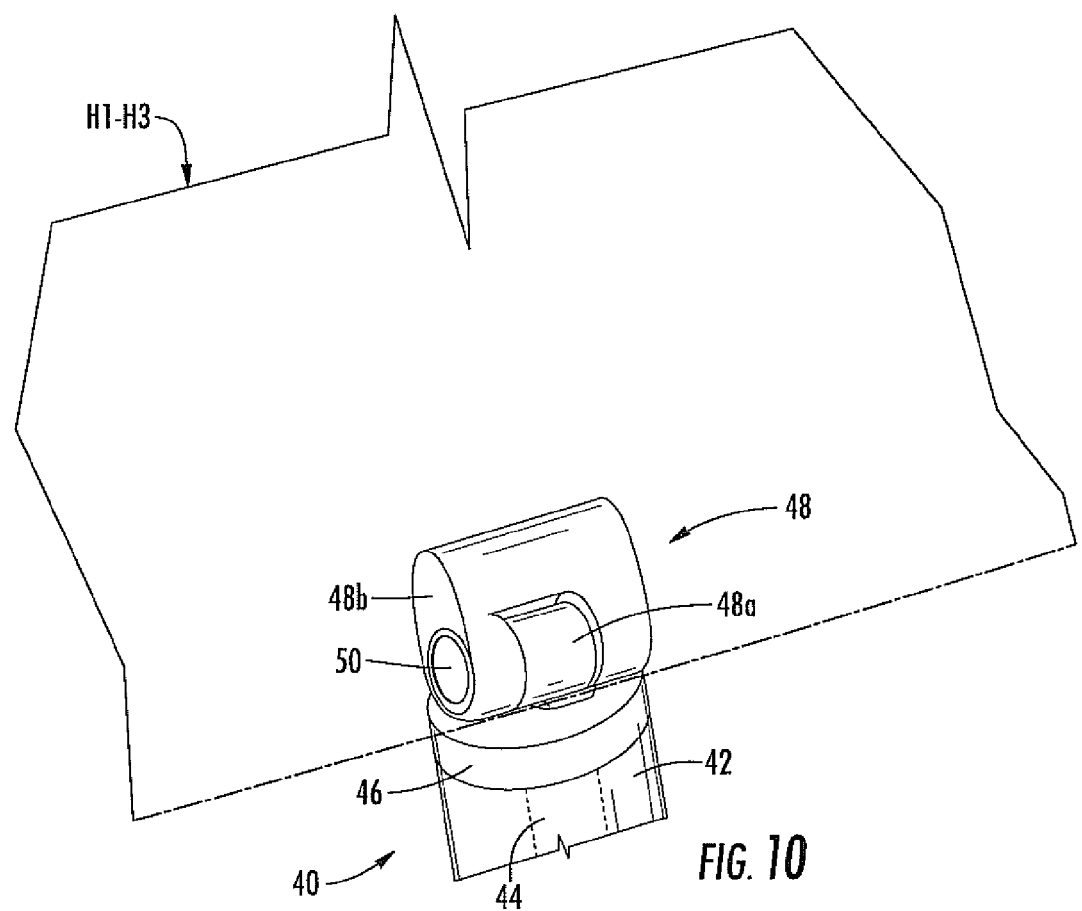
FIG. 10 is an enlarged fragmented view of an articulated joint for attaching hydrofoil fins to the body of the submarines shown in FIGS. 6-9.

Referring to FIG. 10, a mounting or support structure 40 is illustrated that can be used to support the fins H1-H3 to the hull of the submarine. The structure 40 includes a tube 42 that extends into the hull 12 of the submarine and is fixed in relation thereto. Rotatably received within the tube 42 is a rod 44 that is fixed to a support member in the form of a disc 46. The disc 46 can, therefore, be rotated relative to the tube 42 by rotating the rod 44 about its axis. The rod 44, in turn is linked or coupled to a motorized control apparatus within the hull (not shown). A hinge 48 includes a first member 48a fixed to the disc 46 and a second member 48b that is pivotably mounted about pin 50 by any conventional means such as a suitable gear drive well known to those skilled in the art. The hydrofoils or fins H1-H3 are each mounted on and fixed to the second member 48b to allow the fins to be rotated and deflected as may be required. Other mechanisms to achieving such movements of the fins may also be used, such as universal joints or ball socket joints.

Figure 11:
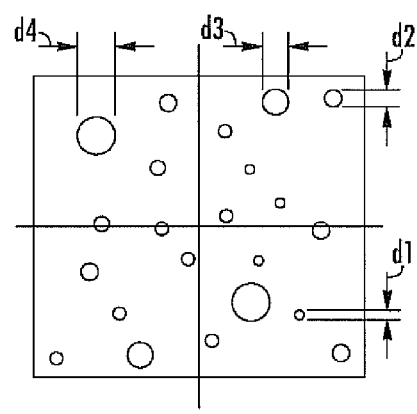
FIG. 11 is a front elevational view of a bluff panel of the type used in FIGS. 4 and 5.

To turn a submarine into a turbulent mixing source we might attach a 10 m×10 m flat plate, say at the bow 14, with a random array of holes in a range of roughly <1.5 through the plate as shown in FIG. 11. The hole diameters d1-d4 may range from 0.1 m to 1.0 m, in a presently preferred embodiment The holes will reduce drag and promote the cascade of turbulence. Moving this through an ocean should produce the full range of eddies below 15 m range, since the Reynolds number $\sim O(10^9)$ assures that the full cascade of scales will be present. Best results, in accordance with the invention, require that the submarines and any turbulence-generating devices mounted thereon (in the extended, operative positions) exhibit Reynolds numbers $\geq 10^9$.

Diminishing the Intensity and Frequency of Tropical Storms

On the basis of the above estimates, a 100 km×100 km section of ocean surface can be cooled 5° C. by one submarine in approximately 24 days. For example, $$\frac{W}{P} = \frac{10^{14}}{5 \times 10^7} \sec \approx 24 \text{ days} \quad (12)$$

A more substantial section of ocean surface, say 300 km×300 km (15,000 sq. miles), could be cooled by, for example, nine submarines in the same 24 day period. To minimize the number and strength of hurricanes in a given year, a desired number of submarines could cool the section of ocean a few weeks before the hurricane season.

Particular deployment of submarines can be optimized according to simulation models. Several factors support the proposition that the above mixing times can be achieved by, for example, nine submarines traveling at the depth of the thermocline. For example, the Reynolds number for typical submarine movement is $0(10^8)$, and the diameter of the turbulent wake is known to expand proportionally to $x^{1/3}$ to $x^{1/2}$ where x marks the distance traveled, as explained in Carmody, J. Basic Engng. Trans. A.S.M.E. (1964), Chevray, The turbulent wake of a body of revolution, J. Basic Engineering, Vol. 90 (1968), and Jiménez, et al., Preliminary velocity measurements in the wake of a submarine model, 4th International Symposium of Particle Image Velocimetry, Sep. 17-19, 2001, which are hereby incorporated by reference. After a suitable initial time, measured in minutes, to allow the submarines to develop sufficient eddy generation, 9 submarines traveling in parallel, roughly 500 meters apart from each other, could well mix 2,500 km² in roughly 18 hours.

Two additional effects enhance the turbulence intensity and aid in retarding natural turbulence decay. First, vertical stratification enhances the horizontal spread of eddies. This effect, sometimes referred to as "wake collapse," facilitates the lateral spread of turbulence. Second, the ocean surface itself acts as a reflecting surface for turbulent eddy spread, hence also enhancing horizontal spread of the turbulent eddies.

Figure 12:
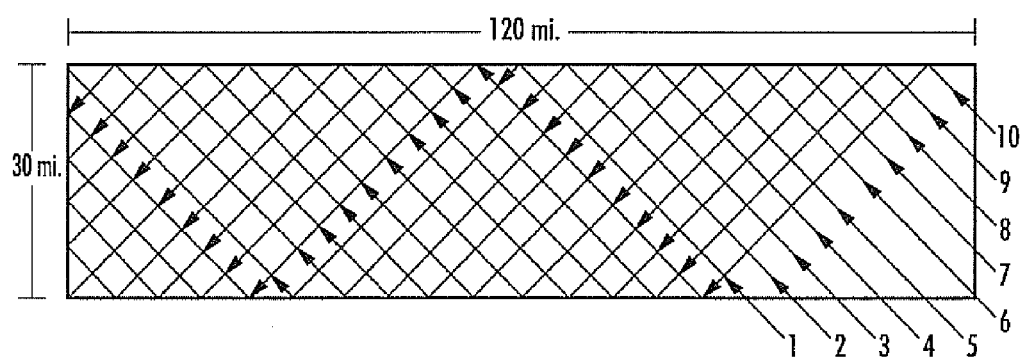
FIG. 12 illustrates one proposed deployment of submarines to mix and cool a rectangular patch of a body of water that is generally coextensive with a track of a hurricane.

FIG. 12 exhibits a proposed deployment pattern of 10 submarines acting as turbulators to cool the surface layer of a 30 mi×120 mi patch of ocean considered above for a hurricane track leading to landfall. Based on the calculations given above this would require 12 hours, and therefore $2 \times 10^{14}$ J of work.

Gallacher et al. (1989) observed the dramatic effect of "a 2.5° C. decrease in temperature". These authors certainly do not mean that this will hold for some brief cooling duration. To estimate a sensible duration for cooling an analysis by Emanuel (1991) is useful that models the dynamics of a hurricane by a Carnot cycle driven by the air-ocean interface of the hurricane. Emanuel (1989, 2003) has estimated the period of the Carnot cycle as being ~15 hours, and we use this as an estimate for the required cooling time.

The proposed activity pattern of FIG. 12 covers a nominal duration of 12 hours of hurricane tracking, which might be inadequate. Doubling the ocean patch of hurricane the track to 30 mi×240 mi, 48 hours of mixing at a cost of 4×10$^{14}$ J, might provide a more telling effect on the hurricane intensity. Will Full Mixing be Achieved?

The submarine tracks depicted in FIG. 12 are spaced 6 mi/√2≈7 km apart and there might be concern about the degree of mixing. In addition to turbulent mixing being highly efficient there are several additional fluid dynamical effects which enhance the mixing process. As shown by Prandtl (Landau & Lifshitz, 1987) the trailing turbulent wake after many body lengths of evolution enters a scaling region that scales as the distance traveled to the cube root power. If a denotes the diameter of the wake in meters then for our deliberations this results in $$a \approx \sqrt{A}\left(C_f^b \frac{U^b t}{\sqrt{A}}\right)^{1/3}, \quad (13)$$

after a time t. For t=48 hr. with A=10$^2$ meters and the above values of $C_f^b$ and $U^b$ we obtain $$a = O(10^3)m. \quad (14)$$

(14) is conservative since early wake growth is linear before scaling slowly sets in. Also since the ocean surface can reasonably be taken as a reflecting boundary which implies that (14) might be doubled; and in view of the density gradient the lateral spread of the wake is significantly enhanced, especially when the wake is near collapse (Schooley, 1967).

Finally it can be observed from FIG. 12 that the sea surface is tessellated into squares so that spread need only reach to 3.5 km to achieve full mixing.

Figure 13:
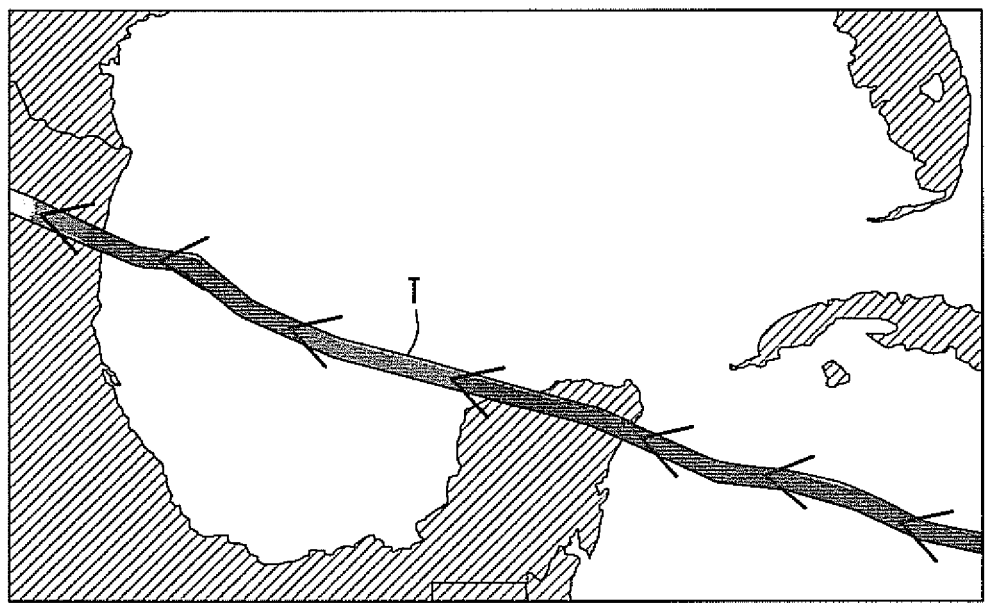
FIG. 13 illustrates, as an example, the path or course of the 1988 Hurricane Gilbert as it passed over the Yucatan Peninsula into the Gulf of Mexico before reaching the Mexico mainland.
Figure 14:
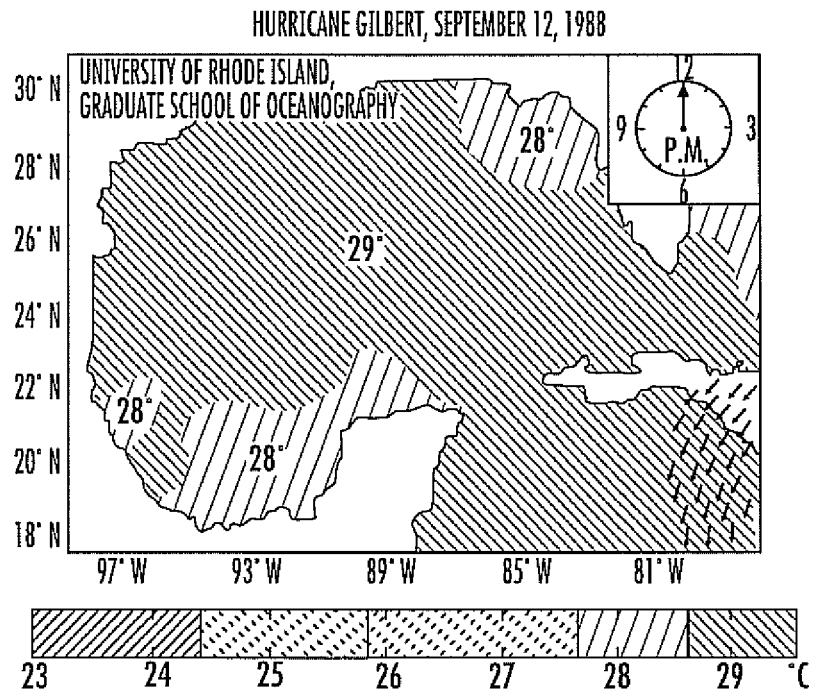
FIG. 14 illustrates an image of the sea temperature on Sep. 12, 1988 prior to Hurricane Gilbert traversing the trajectory shown in FIG. 13.
Figure 15:
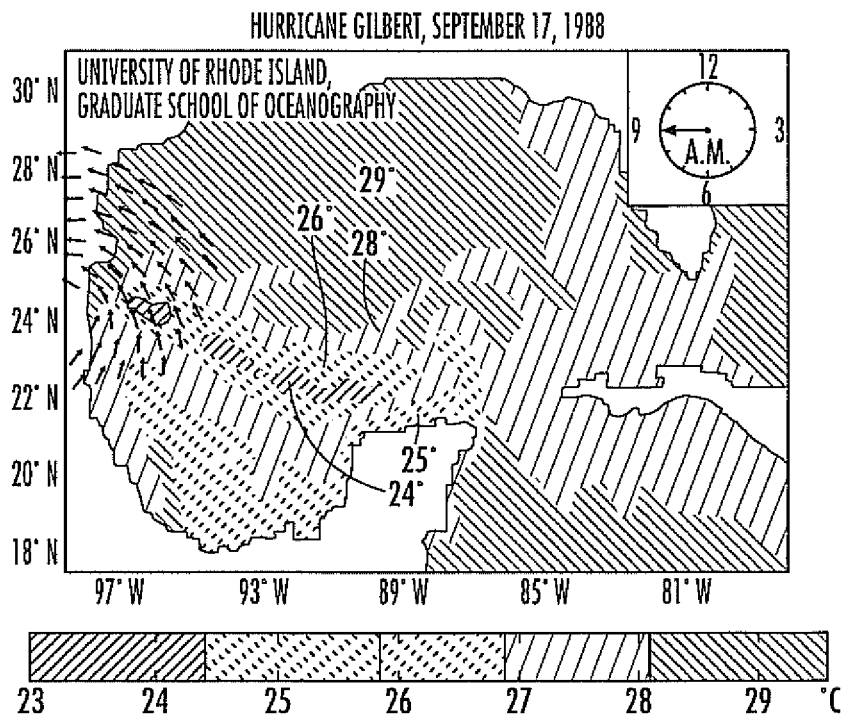
FIG. 15 is similar to FIG. 6 but illustrates the sea temperature on Sep. 17, 1998 after Hurricane Gilbert has traversed the trajectory shown in FIG. 13 and made landfall.

Another concern might be whether cooling would persist long enough to be effective. Support for the efficacy of the above mixing approach to ocean cooling comes from sea surface imagery of hurricanes. A consequence of a hurricane passing over an ocean is that it performs the same type of ocean mixing that is proposed to achieve. FIG. 13 illustrates the path or course of the 1998 Hurricane Gilbert, moving from East to West from the Caribbean over the Yucatan Peninsula into the Gulf of Mexico before the landfall over Mexico. In FIGS. 14-15 sea surface temperature images are shown acquired for the 1988 hurricane Gilbert as it passed over the Yucatan into the Gulf of Mexico (a full AVI file is obtainable from the University of Rhode Island). FIG. 14 shows sea surface temperatures roughly a day before the track passes over the Yucatan. Thus, on Sep. 12, 1998 the body of water to be traversed by Hurricane Gilbert was approximately 29° C. and some coastal regions approximately 28° C. Sea surface temperatures four days later are shown in FIG. 14, where temperatures along the track of the eye of the hurricane dropped 4-5° C. to 24-25° C. and the water adjoining the track dropped approximately 3° C. to 26° C. The considerable lateral spread and the persistence of cooling is clear from the imagery. Concern about the temporal persistence of ocean cooling is certainly dispelled. Clearly four days after the passing of the hurricane, the sea surface layer remains well cooled.

One additional observation can be made on the basis of the classical dependence of surface wave attenuation on depth z, $$\text{Attenuation} \propto e^{-2\pi z/\lambda} \quad (15)$$

where λ is the wavelength. Since it is envisioned that submarine turbulators will operate at a depth of roughly 50 m, the submarine pack may bring up cooler waters than the hurricane itself and this may produce a greater cooling effect than seen in the imagery. As an aside it follows from (15) that submarines can safely operate in their mission during the passing of a hurricane.

It has been estimated that a developed hurricane can expend an energy up to 10$^{17}$ J in one day, which is several orders of magnitude more than the 4×10$^{14}$ J discussed above. This discrepancy in scale has to be a cause for concern. Hurricanes are extremely large scale entities and the impact of the suggested relatively small perturbations being proposed is not clear. Some light on this issue might be revealed by simulations.

Figure 16:
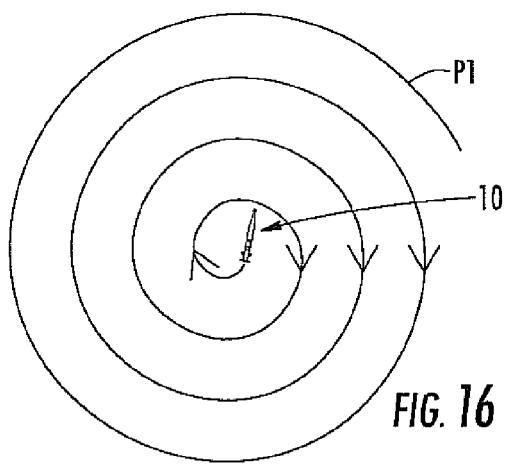
FIG. 16 illustrates an exemplary path of a submarine in the region of a tropical storm before it develops into a hurricane.
Figure 17:
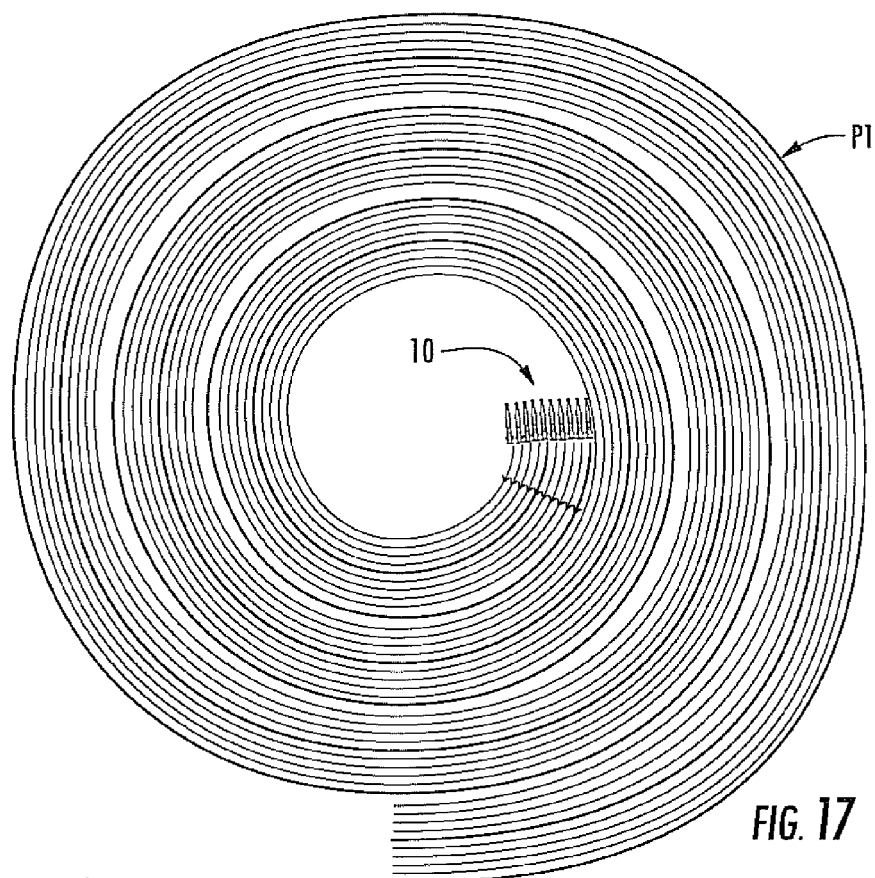
FIG. 17 illustrates a plurality of submarines moving along paths suggested in FIG. 16 to prevent a tropical storm from developing into a hurricane.

Another strategy for dealing with hurricanes is suggested by the generally accepted explanation that North American hurricanes are spawned off the west coast of Africa as tropical storms; with relatively weak cyclonic activity. Since this phenomenon is well monitored it is proposed that sea surface cooling of these embryonic storms could prevent their eventual assembly as stout's with organized cyclonic activity. Referring to FIG. 16 an exemplary path P1 of a single submarine 10 is shown that can be traversed in the region of a tropical storm before it develops into a hurricane. For hurricanes developing in the Northern Hemisphere, where wind flow is in a counterclockwise direction, a submarine is shown to travel along a spiral path in a clockwise direction. When provided with components that enhance or optimize the creation of turbulent flow at high Reynolds numbers to produce chaotic eddies, vortices and other flow instabilities, such movement of the submarine both mixes the warmer and colder layers of water and counteracts the natural counterclockwise embryonic cyclonic wind flows and sea's cyclonic vorticity due to the Earth's rotation to neutralize or reduce their effectiveness to intensify and even develop an eye. In FIG. 17, ten submarines move in parallel anti-cyclonic spiral paths P1 to enhance both mixing of the water to lower the surface temperature and counteract the normally counterclockwise spiraling of both water and air movements, in the Northern Hemisphere, while the conditions are still those of a tropical depression (sustained winds of up to 29 knots) or a tropical storm (sustained winds of up to 30-55 knots).

Figure 18:
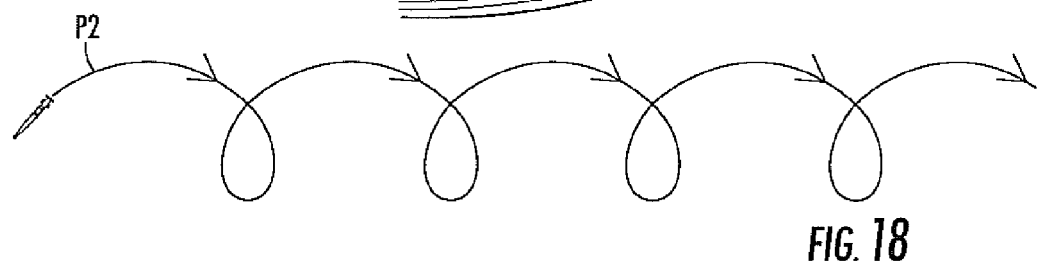
FIG. 18 illustrates an exemplary path for a submarine for reducing the temperature while moving the water in a clockwise cyclonic direction to counter the natural counterclockwise voracity induced in the Northern Hemisphere by the Earth's rotation.

While the patterns shown in FIGS. 16 and 17 might be implemented when a tropical depression or storm is substantially stationary, large scale winds in the Earth's atmosphere and other factors, such as other low pressure systems, high pressure systems and warm and cold fronts, cause essentially linear movements along a path or track T (FIG. 13), as suggested in FIG. 5. To address such movements along a linear track one or more submarines can move along a cycloid-like path P2 in a horizontal plane, as suggested in FIG. 18, wherein the submarines move both in a clockwise direction while following a linear path coextensive with the track of the tropical storm. Such movement of submarines with turbulence generating devices spins the water in a clockwise motion to introduce a negative vortex to counter the natural tendency to spin in a counterclockwise direction due to the rotation of the Earth.

A simple argument suggests that the destructive cost of a hurricane is measured by the rate of work performed by the hurricane forces. Since the principal force is due to pressure, force is therefore $\propto V_m^2$, where $V_m$ is the maximal wind velocity. Thus the rate of work and hence the damage $\propto V_m^3$. Higher than cubic powers have been suggested, and other measures e.g., minimum pressure measurements have been mentioned as determinants of the damage incurred by hurricanes (see Impact, 2011 for references). For present purposes it will suffice if the estimated destructive cost $D_c$ is calculated by $$D_c \propto V_m^3. \quad (16)$$

Thus if $V_m$ is diminished by 20% the estimated cost $D_c$ is halved!

As a hypothetical situation we suppose that the development cost will be $100M to test the proposed program and that it has a small probability p=1/100 of succeeding. Based on a $10 billion/year hurricane cost over a ten year period, or one Katrina event ($10^{11}$), the expected gain is $$\$\text{Gain} = \frac{1}{100} \times \$10^{11}/2 - \frac{99}{100}\$10^8 \approx \$4 \times 10^8, \quad (17)$$

which strongly suggests this would be worthwhile especially in view of the earlier remarks about growth in destruction costs over time. Both the probability, p=1/100, and the cost, $100M, are taken out of thin air just to illustrate that even under long odds and high costs pursuit of the project appears to be justified.

The foregoing presents compelling evidence that the following three steps should be taken:
- Large scale simulation of the effect of the suggested ocean cooling on the intensity of hurricanes.
- Large scale simulation of the suggested ocean cooling of tropical storms.
- Fit and test a real submarine with a turbulating device by monitoring its performance in achieving ocean cooling through satellite imagery.
- Alteration of Hurricane Paths and Intensity.

Current modeling and simulation provide reasonable forecasts for hurricane paths for up to 5 days. The core region of a hurricane, which accounts for energy uptake of the upper warmer layer of ocean, generally spans an area approximately 50 km×50 km. Such a region can be cooled 5° C. by 9 submarines in approximately 18 hours.

The above determined 18 kts modified submarine speed permits the submarines to outrun the hurricane. An interactive strategy of ocean cooling and renewed path forecasting provides a dynamic program for quenching and/or redirecting hurricanes. Under natural conditions, the path of a hurricane is determined by available warm surface waters to fuel its movement and intensity. Therefore, selective cooling of the upper layer of ocean water can be used to redirect the path to areas less vulnerable than populated cities, such as the open ocean. However, to be effective the cooling must be timely and include mixing ahead or in advance of a hurricane but not too long in advance. Effective mixing and cooling should be implemented 1-2 days before a hurricane traverses its course to allow the body of water to stabilize at its reduced temperature without allowing the surface layer to revert to its higher temperature.

It has been suggested that ocean mixing might raise concerns from environmentalists. This should not become an issue since it is well documented that mixing of the sort proposed here can only enhance the food chain in oceans, and in addition will mix the well oxygenated surface layer of oceans, the lack of which is an ongoing concern in the environmental community.

The fixed plate which for illustration is placed at the bow would present problems in cruise circumstances. In actuality what is proposed is that under cruise conditions the flat plate lies flush along the deck and flush with the submarine bottom. Under mixing conditions these will be deployed to their required perpendicular state by mechanical means.

The flat plate, or its equivalent, at the high Reynolds operating condition guarantees a turbulent mixing cascade descending from scales of about 12-15 m. Thus if the submarines operate at roughly 40-50 m it may prove to be necessary to create larger scale eddies. In the Patent it is suggested that this is achieved by a series of pairs of positive and negative lifting fins which would lie along the vessel in cruise circumstances and then deployed under mixing conditions (FIGS. 7-10).

The proposed application to tropical storms and depressions requires a somewhat different strategy since tropical storms and depressions have a less well-defined structure than a hurricane. Under such circumstances it is proposed that the submarine pattern take on outward anti-cyclonic spiraling tracks, adjusted to travel with the center of the storm activity. The purpose of the anti-cyclonic element is to use the entrained fluid motion created by the submarine pack to confer a component of anti-cyclonic vorticity. One of the essential conditions, not specifically mentioned above, is the need of cyclonic vorticity in the ocean for hurricane production. This is normally induced by the earth's rotation. (Zero vorticity is induced at the equator, and virtually no hurricane activity occurs in a ±5° belt of the equator.)

Negating the natural vorticity therefore becomes an addition to diminishing the effect on hurricane formation. This concept shown in FIG. 12 can also be adapted to tracks depicted in FIG. 18.

Although certain preferred exemplary embodiments of the present invention have been shown and described in detail, it should be understood that various changes and modifications may be made therein without departing from the scope of the appended claims.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BIBLIOGRAPHY

1. Emanuel, K. A. (1989) The finite-amplitude nature of tropical cyclogenesis. *J. Atmos. Sci.,* 46:3431-3456.
2. Emanuel, K. A. (1991) The theory of hurricanes. *Annu. Rev. Fluid Mech.,* 23:179-196.
3. Emanuel, K. A. (1999) Thermodynamic control of hurricane intensity. *Nature,* 401:665-669.
4. Emanuel, K. A. (2003) Tropical Cyclones. *Annu. Rev. Earth Planet Sci,* 31:75-104
5. Gallacher, P. C., Rotunno, R. and Emanuel, K. A. (1989) *Tropical cyclogenesis in a coupled ocean-atmosphere model*. Presented at 18$^{th}$ Conf. Hurric. Trop Meteorol., Miami Fla.
6. Gray, W. M. (1979) Hurricanes: their formation, structure and likely role in the tropical circulation. In: Meteorology Over the Tropical Oceans, ed. D B Shaw, pp. 155-218. Reading, UK: R. Meteorol. Soc.
7. Landau, L. D. and Lifshitz, E. M. (1987) Fluid Mechanics. Vol. 6 (2$^{nd}$ ed.). Butterworth-Heinemann.
8. Lighthill, M. J. (1998) *Fluid Mechanics of Tropical Cyclones. Theoret. Comput. Fluid Dynamics,* 10: 3-21
9. *Managing the Risks of Extreme Events and Disasters to Advance Climate Change Adaptation* (2012) Special Report of the Intergovernmental panel on Climate Change.
10. Mendelsohn, R., Emanuel, K. Chonabayashi, S. (2011) *The Impact of Climate Change on Hurricane Damages in the United States*. The World Bank, Finance Economics and Urban Department, Global Facility for Disaster Reduction and Recovery.

11. Sirovich, L., Method for Decreasing the Intensity and Frequency of Tropical Storms or Hurricanes, U.S. Pat. No. 8,262,314, issued on Sep. 11, 2012.
12. Schooley, A. H. (1967) Wake collapse in a stratified fluid. *Science*, 157: 421-423.

What is claimed is:

1. A system for cooling a section of a large body of water forming an upper warmer layer of water and a cooler lower layer of water, comprising:
   a) a plurality of submarines at predetermined positions in a section of the large body of water each submarine being provided with propulsion means for propelling the submarine along a desired course and maneuvering control means for controlling the orientation of the submarine while being propelled; and
   b) at least one turbulence generating device substantially stationary relative to the submarine during use when attached to each of the submarines and configured and arranged for increasing turbulence with substantially no net change in lift when submerged in addition to any turbulence that may be created by said submarine and said propulsion and maneuvering control means, said predetermined positions being selected so that when said plurality of submarines follows a predetermined path through the section of the large body of water at a selected speed sufficient to create at least 10 m eddy turbulence and mix the warmer upper layer of the section of the large body of water with water from the cooler lower layer of the section of the large body of water as a result of movement of said at least one turbulence generating device through a thermocline layer of the section of the large body of water, mixing is achieved by generating eddy turbulence while upwardly displacing sufficient cooler water into the upper warmer layer of water to lower the temperature of the upper layer in the section over an area corresponding to a core region of a hurricane.

2. The system as defined in claim 1, wherein said plurality of submarines comprises a number of submarines selected from the range of 8-11 submarines substantially equally spaced from each other as they traverse the large body of water.

3. The system as defined in claim 2, wherein 10 submarines are used.

4. The system as defined in claim 1, wherein said at least one turbulence generating device includes at least one set of fins on the starboard and port sides of the submarines in the shapes of hydrofoils to enhance mixing of the warmer upper layer of water with water from the cooler, lower layer of water.

5. The system as defined in claim 1, wherein the at least one turbulence generating device is movably mounted to lie flat along the outer surface of each of said plurality of submarines when creation of turbulence is not desired, and fold away from the surface of the submarine to a position substantially normal to the direction of movement of the submarine when turbulence creation is desired.

6. The system as defined in claim 1, wherein the at least one turbulence generating device is retractable into a hull of each of said plurality of submarines when turbulence is not desired, and extends outwardly from the surface of the submarine when turbulence is desired.

7. The system as defined in claim 1, wherein said at least one turbulence generating device is in the form of a flat plate having a bluff surface when moved to an operational position.

8. The system as defined in claim 7, wherein said flat plate is generally rectangular and said bluff surface is approximately 10 m×10 m.

9. The system as defined in claim 7, wherein said flat plate is provided with internal apertures or holes to allow water to flow therethrough.

10. The system as defined in claim 9, wherein said internal apertures or holes are variably dimensioned.

11. The system as defined in claim 1, wherein said at least one turbulence generating device comprises a flat plate exhibiting a bluff surface mounted on the bow of the submarine.

12. The system as defined in claim 1, wherein said at least one turbulence generating device comprises a flat plate exhibiting a bluff surface mounted downstream from the bow of each of said plurality of submarines.

13. The system as defined in claim 1, wherein said submarines are spaced from each other approximately 500 m apart when traversing an area of the sea the upper layer of which is to be cooled.

14. The system as defined in claim 1, wherein said turbulence generating device includes at least one set of fins on the starboard and port sides of the submarines in the shapes of hydrofoils to enhance the mixing of the water.

15. The system as defined in claim 1, wherein a plurality of fins are mounted on and spaced from each other on each submarine hull oriented to establish desired angles of attack relative to the direction of movement to provide one of positive or negative lift and together adding up to substantially zero lift for all said fins on the submarine while deflecting water to simulate turbulence that enhances the sizes and ranges of resulting eddies.

16. The system as defined in claim 15, wherein said fins are mounted for pivoting about substantially horizontal axes normal to each of said plurality of submarine's directions of movement to allow said fins to be selectively oriented to avoid or minimize creation of turbulence or to optimize turbulence.

17. A method for cooling a section of a large body of water forming an upper warmer layer of water and a cooler lower layer of water, comprising the steps of:
   a) arranging a plurality of submarines at predetermined positions in a section of the large body of water each submarine being provided with propulsion means for propelling the submarine along a desired course and maneuvering control means for controlling the orientation of the submarine while being propelled; and
   b) attaching at least one turbulence generating device substantially stationary relative to the submarine during use when attached to each of the submarines and configured and arranged for increasing turbulence with substantially no net change in lift when submerged in addition to any turbulence that may be created by said submarine and said propulsion and maneuvering control means, said predetermined positions being selected so that when said plurality of submarines follows a predetermined path through the section of the large body of water at a selected speed sufficient to create at least 10 m eddy turbulence and mix the warmer upper layer of the section of the large body of water with water from the cooler lower layer of the section of the large body of water as a result of movement of said at least one turbulence generating device through a thermocline layer of the section of the large body of water, mixing is achieved by generating eddy turbulence while upwardly displacing sufficient cooler water into the upper warmer layer of water to lower the temperature of the upper layer in the section over an area corresponding to a core region of a hurricane;

c) selecting said predetermined positions so that said plurality of submarines follow a predetermined path through the section of the large body of water at a speed sufficient to create eddy turbulence and mix the warmer upper layer of the section of the large body of water with water from the cooler lower layer of the section of the large body of water as a result of movement of said at least one turbulence generating device through a thermocline layer of the section of the large body of water;

d) mixing said upper and lower layers by generating eddy turbulence while upwardly displacing sufficient cooler water into the upper warmer layer of water to lower the temperature of the upper layer in the section over an area corresponding to a core region of a hurricane, said predetermined path being counter to cyclonic movements of the large body of water to counter natural vorticity in the large body of water induced by the Earth's rotation.

18. The method for moving a plurality of submarines as defined in claim 17, wherein said plurality of submarines move outwardly along spiral paths in a clockwise direction.

19. The method for moving a plurality of submarines as defined in claim 17, wherein said plurality of submarines move along a generally cycloidal path while moving along a projected path or track in advance of a hurricane.

20. A system for cooling a section of a large body of water forming an upper warmer layer of water and a cooler lower layer of water, comprising:

a) a plurality of submarines at predetermined positions in a section of the large body of water; and b) at least one turbulence generating device attached to each of the submarines, said turbulence device being in the form of a flat generally rectangular plate having a bluff surface approximately 10 m×10 m when moved to an operational position and provided with internal variably dimensioned apertures or holes to allow water to flow therethrough, said predetermined positions being selected so that when said plurality of submarines follow a predetermined path through the section of the large body of water at a selected speed sufficient to create eddy turbulence and mix the warmer upper layer of the section of the large body of water with water from the cooler lower layer of the section of the large body of water as a result of movement of said at least one turbulence generating device through a thermocline layer of the section of the large body of water, mixing being achieved by generating eddy turbulence while upwardly displacing sufficient cooler water into the upper warmer layer of water to lower the temperature of the upper layer in the section over an area corresponding to a core region of a hurricane.

21. The system as defined in claim 20, wherein said apertures or holes are circular and have diameters selected to be ≤1.5 m.

* * * * *